Dec. 3, 1940.    C. L. HOPKINS    2,223,614
POWER TRANSMISSION MECHANISM
Filed April 1, 1936    5 Sheets-Sheet 2

INVENTOR
Charles L. Hopkins
BY
Jones, Addington, Ames & Seibold
ATTORNEYS

Dec. 3, 1940.                C. L. HOPKINS                2,223,614
                      POWER TRANSMISSION MECHANISM
                         Filed April 1, 1936         5 Sheets-Sheet 3

INVENTOR
Charles L. Hopkins
BY
Jones, Addington, Ames & Seibold
ATTORNEYS

Dec. 3, 1940.  C. L. HOPKINS  2,223,614

POWER TRANSMISSION MECHANISM

Filed April 1, 1936  5 Sheets-Sheet 4

INVENTOR
Charles L. Hopkins
BY
Jones, Addington, Ames & Seibold
ATTORNEYS

Dec. 3, 1940.   C. L. HOPKINS   2,223,614
POWER TRANSMISSION MECHANISM
Filed April 1, 1936   5 Sheets-Sheet 5

Fig.11   Fig.12

INVENTOR
Charles L. Hopkins
BY
Jones, Addington, Ames & Seibold
ATTORNEYS

Patented Dec. 3, 1940

2,223,614

UNITED STATES PATENT OFFICE 2,223,614

POWER TRANSMISSION MECHANISM

Charles L. Hopkins, River Forest, Ill.

Application April 1, 1936, Serial No. 72,037

9 Claims. (Cl. 74—260)

This invention relates to certain improvements in power transmission mechanism suitable for use in motor vehicles, and particularly to a type of such mechanisms wherein speed responsive means (such as a set of centrifugal weights) is employed to cause the shifting of a clutch or clutches and thereby to change the speed ratio between driving and driven elements of the mechanism, as, for instance, in an automatic overdrive.

In a type of overdrive mechanism in general use at the present time, the drive is at times through an overrunning clutch, and at such times the engine cannot act as a brake to slow down the car speed or hold the car back when going down hill. If the driver desires to take advantage of the braking ability of the engine, he must move a manually operable control to close a positive clutch and thus cut out the overdrive.

One of the objects of the present invention is to provide a change-speed device for motor vehicles in which there is a positive connection between the main shaft and the tail shaft, regardless of whether the drive is through a direct coupling between these shafts or through gearing to change the speed ratio between them.

Another object is to provide an overdrive device in which the parts are so constructed and arranged that the engine may be depended upon at all times to act as a brake with the same degree of reliability as would obtain if the vehicle were not equipped with the overdrive device.

Another object is to render the use of a non-automatic clutch unnecessary when backing the vehicle (transmission in reverse).

Another object is to provide a construction which is relatively economical to manufacture.

In the device shown in the drawings and described in this specification, there is employed a type of clutch which when opened cannot again close until the inter-engaging parts of the driving and driven members are brought into substantial synchronism whereby is accomplished another object of the invention, namely, to provide a device of this class in which shifting is accomplished without clashing of engaging parts, and with a minimum of noise and shock.

Another object is to provide a clutch which, when forming part of a gear shifting mechanism, permits shifting without the necessity of first disconnecting the engine, as by opening the main clutch.

In the several figures of the drawings, 10 is the casing of the sliding gear transmission, 11 is the main shaft of the transmission, 12 is the countershaft gear cluster, and 13 is the low speed and reverse sliding gear. The main shaft 11 is extended beyond the rear wall 14 of the transmission casing and is piloted in the tail shaft 15, anti-friction rollers 11a and 15a being provided at suitable points. The tail shaft 15 is supported in a ball bearing 16 and is connected to the drive wheels of the vehicle by a universal joint and propeller shaft (not shown). The ball bearing 16 is supported in the rear portion 17a of the casing 17 of the overdrive device. In the form shown in Fig. 1, the forward end 17b of this casing is bolted to the transmission casing, although it could be formed integral with casing 10, as in the form shown in Fig. 11. A removable cover plate 17c permits the changing of lubricant when necessary.

In the form of the invention illustrated in Figs. 1 to 10, inclusive, there is employed a type of planetary gearing so arranged that when the drive is through the planetary gearing the tail shaft is revolved at a speed higher than that of the main shaft. This gearing includes the sun gear 18, the internal ring gear 19, a series of planet pinions 20, 21, 22, and 23, and the planet carrier 24. The sun gear 18 is stationary and comprises a toothed ring through which extend the main shaft 11 and the hub 25 of the planet carrier 24, and is formed with, or may be secured to, a supporting plate 26 which is securely bolted to the end wall 14 of the transmission casing. The planet carrier hub 25 is splined to the main shaft so as to turn with the latter. It is prevented from moving along the shaft to the left in Fig. 1 by a snap ring 27. Each planet pinion 20, 21, 22, and 23 turns on anti-friction rollers 28 which ride on a collar 29. The planet assembly includes also a flat ring 30 between which and the carrier 24 the pinions are confined and prevented from moving axially. Bolts 31 extend through the ring 30 and the collars 29 and are threaded into the carrier 24. Other collars 32 and bolts 33 give the assembly added rigidity and ability to withstand torsional strains.

Figure 1:
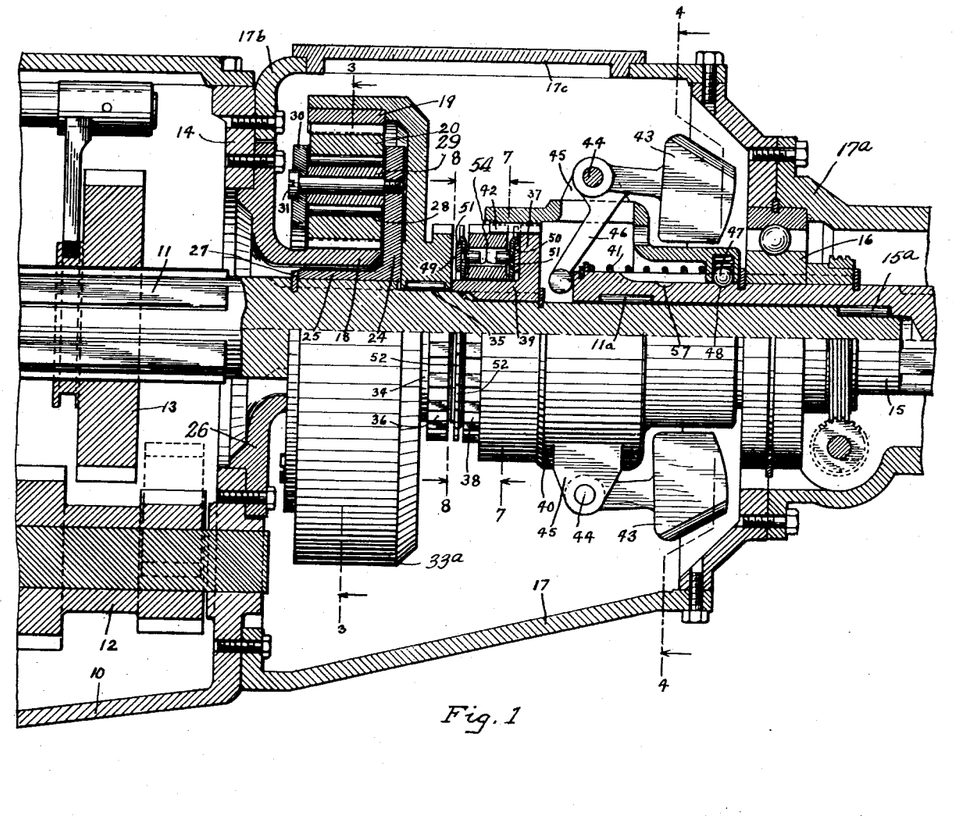
Figure 1 is a view, partly in elevation and partly in vertical, longitudinal section, showing a portion of a variable speed transmission of the sliding gear type with the overdrive device fitted to it, with certain parts in the positions which they assume when the main shaft is connected to the tail shaft so as to give direct drive to the road wheels.
Figure 2:
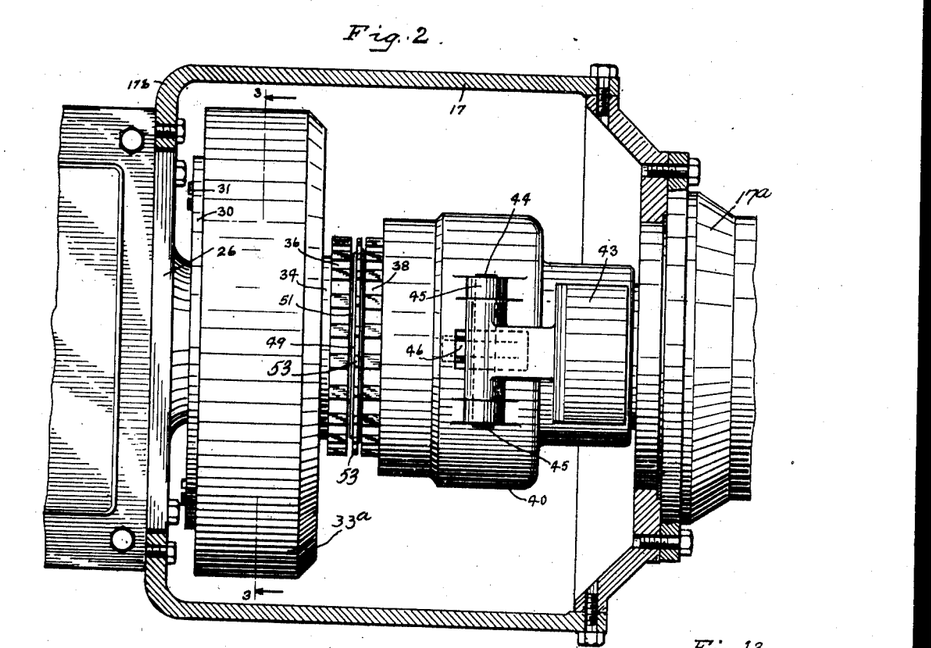
Fig. 2 is a top plan view of the overdrive device with the upper part of the casing removed to show the centrifugal weights and other moving parts.
Figure 3:
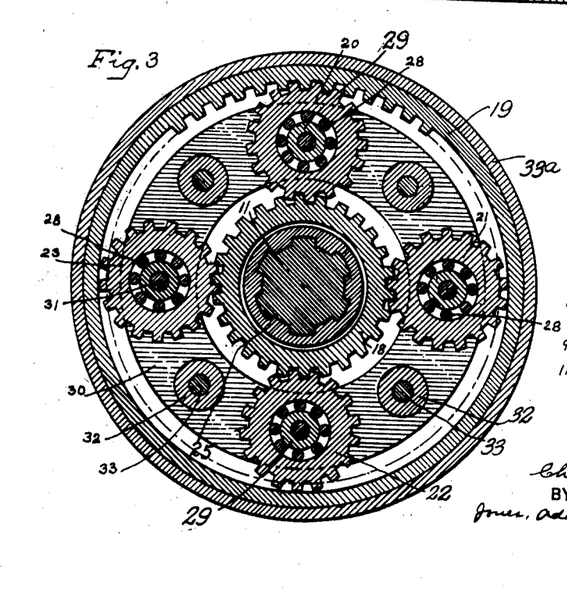
Fig. 3 is a vertical cross-section taken through the planetary gearing on line 3—3 of Figs. 1 and 2.
Figure 4:
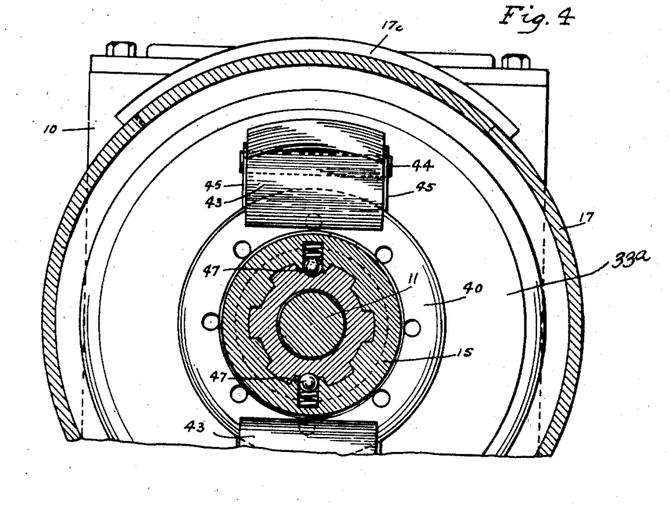
Fig. 4 is a vertical cross-section on line 4—4 of Fig. 1.

The ring gear assembly comprises, beside the gear 19, a member 33a which is formed like a shallow cup and carries the ring gear. This ring gear 19 and carrier member 33a turn with relation to the main shaft 11 and always revolve faster than the latter. Member 33a is formed with a hub 34 which rides on anti-friction rollers 35 arranged around the main shaft 11. This ring gear carrier is formed also with a circular portion 36 having teeth cut around its edge and constituting one member of a dog clutch which is closed when the parts are in the overdrive position.

Splined to the main shaft 11 and turning with it is another toothed member 37 which forms one of the elements of a clutch which is closed when the parts are in direct drive position. Between the clutch members 36 and 37 is a toothed idler member 38 which is arranged to revolve independently of either of the clutch members 36 or 37. As shown, the member 37 has an elongated hub 39 on which this ring-like member 38 revolves and along which it may slide for a short distance.

Figure 5:
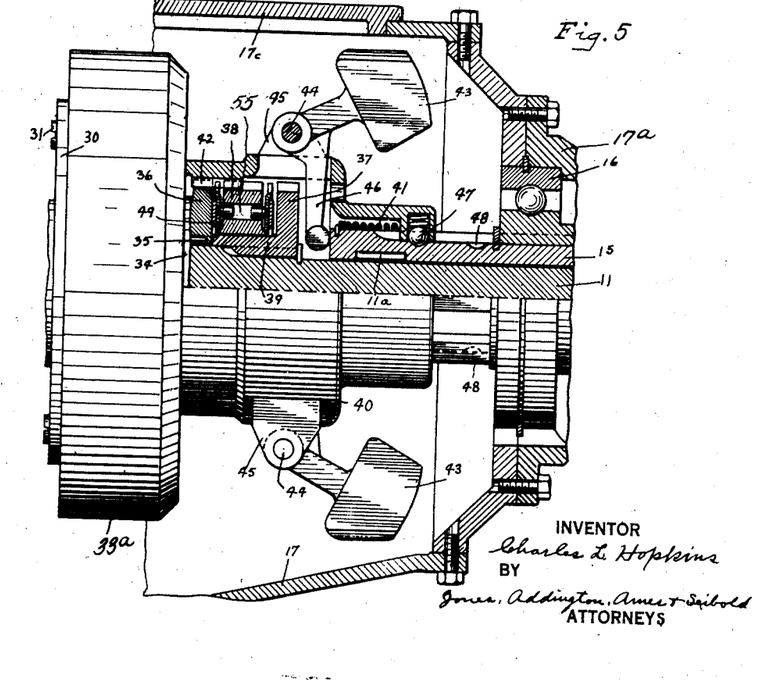
Fig. 5 is a view, partly in elevation and partly in vertical, longitudinal section, showing the parts as they are when the power from the engine is transmitted through the planetary gearing and the tail shaft is made to turn faster than the main shaft.

Splined to the tail shaft 15 so as to turn with but have movement lengthwise of the latter is a hollow sleeve-like coupling member 40. This coupling member is urged toward the rear end 17a of the casing (to the right in Fig. 1) by a spring 41 coiled about the tail shaft within the coupling member. The forward end of member 40 is expanded to a greater diameter than that of the part which encloses spring 41 and has elongated teeth 42 formed on its inner surface, similar to the teeth on an internal gear. These teeth are constantly in mesh with those in on the idler 38 as member 40 is slid back and forth, and, therefore, the idler always turns with the tail shaft. When coupling member 40 is at one end of its travel, its teeth 42 engage with those on clutch member 37, which is splined on the main shaft 11, and of course the tail shaft 15 is then coupled directly to the main shaft, as seen in Fig. 1. This is the direct drive condition. When member 40 is slid forward, as seen in Fig. 5, the teeth 42 are out of engagement with those of clutch member 37 and in engagement with those of clutch member 36. The tail shaft is then coupled to the main shaft through the ring gear 19, pinions 20, 21, 22, 23, and the pinion carrier 24. As the ring gear turns faster than the main shaft, the tail shaft will be driven at a higher speed than that of the main shaft. This is the overdrive condition.

It will be seen that there are in effect two clutches, one of which couples the tail shaft to a slower moving driving element, the other coupling it to a faster moving driving element. Either one of the clutches may be closed but not both at the same time.

Means are provided whereby when the speed of the tail shaft attains a predetermined value (which means, of course, a certain road speed) coupling member 40 will be slid along the tail shaft 15 and its teeth 42 will be disengaged from the teeth on clutch member 37, thus uncoupling the tail shaft from the engine, and thereafter coupling member 40 will be moved still further to cause its teeth 42 to engage with the teeth of clutch member 36.

Means are also provided whereby, after the coupling member 40 has become disengaged from clutch member 37 it will be prevented from coupling with clutch member 36 until the driver of the car has reduced the speed of the engine and thus brought down the speed of clutch member 36 to that of coupling sleeve 40, so that the teeth on these members may engage without clashing.

The speed responsive means for shifting the coupling sleeve 40 to the overdrive position comprises a pair of centrifugal weights 43, 43 pivoted to coupling sleeve 40 by pins 44, 44, each of which is supported in a pair of lugs 45, 45 on the coupling sleeve. Each weight has an arm 46 extending through an opening in the coupling sleeve and bearing at its inner end against the tail shaft 15.

As the speed increases the centrifugal weights tend to fly out from their center of rotation and thus move the coupling sleeve to the left, against the tendency of spring 41 to hold it to the right. Spring-pressed balls 47, 47 carried by the coupling sleeve 40 engage in notches 48, 48 and act as detents to prevent the coupling sleeve from moving until somewhat more force is applied by the centrifugal weights than would be required to overcome the pressure of spring 41. This insures ample power to carry the sleeve over from one position to the other. At a certain car speed, say 45 miles per hour, the balls 47, 47 will be forced out of the notches and the sleeve will move to the left far enough to uncouple itself from clutch member 37, but it does not, and should not, immediately move far enough to couple with clutch member 36, as this member is revolving faster than the coupling sleeve, and the teeth of these members would clash. Means are, therefore, provided for preventing further movement of the coupling sleeve until the speed of member 36 is reduced to that of member 40. This will now be described.

Between idler member 38 and clutch member 36 is arranged a flat disc or ring 49, and on the other side of this idler member 38, between the latter and clutch member 37 is arranged a similar ring 50. One of these rings is shown by itself in Fig. 9. Each ring carries a friction ring 51 of fiber or other suitable material on the side facing the clutch member. Each ring is formed with a series of notches 52 around its outer edge corresponding in number and spacing with the teeth on clutch members 36 and 37, idler ring 38, and coupling sleeve 40. These notches are preferably slightly wider than the teeth of these members.

Figures 6, 7, 8, 9, 10:
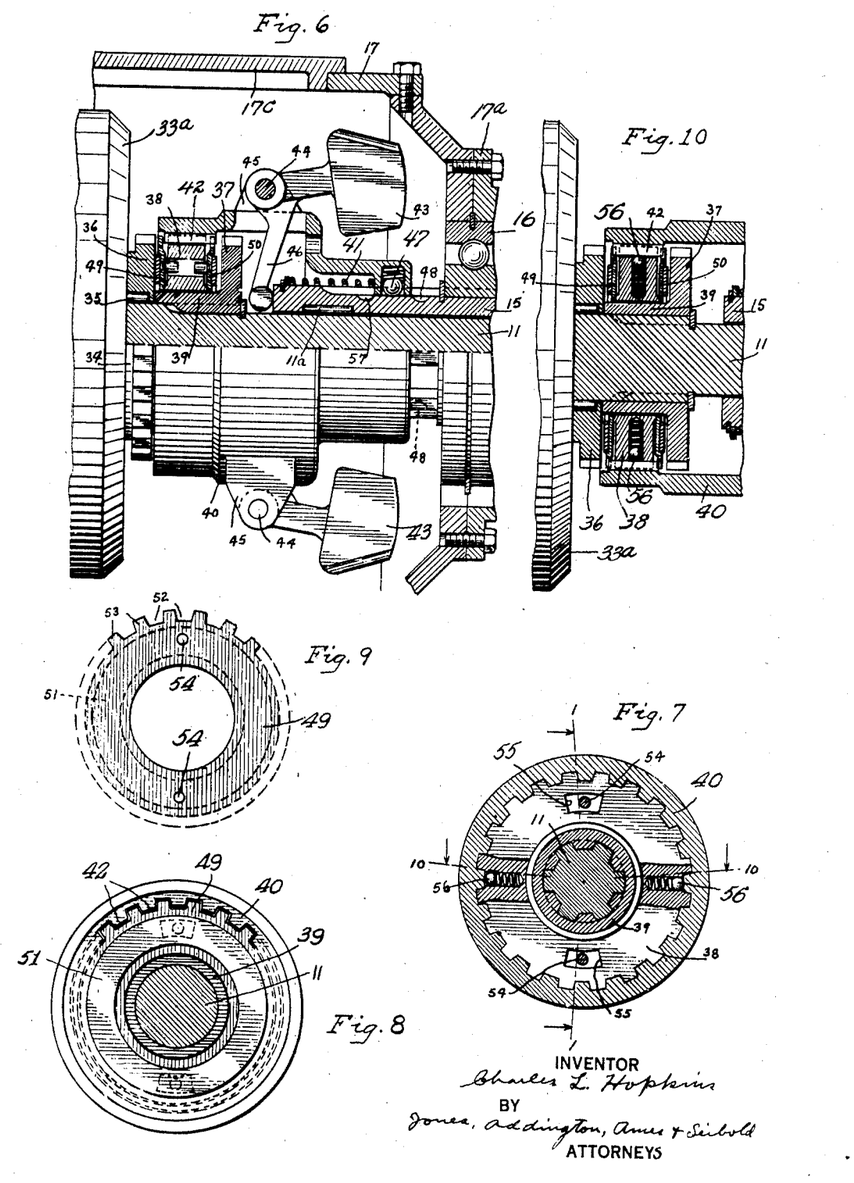
Fig. 6 is a view, partly sectional, showing an intermediate step in the shifting from direct drive to overdrive.
Fig. 7 is a vertical cross-sectional view taken on line 7—7 of Fig. 1, showing clutch details.
Fig. 8 is a vertical cross-sectional view taken on line 8—8 of Fig. 1, showing clutch details.
Fig. 9 is an elevational view of one of the blocking rings which prevent the coupling sleeve from completing the shift until the speeds of the clutch parts synchronize.
Fig. 10 is a fragmentary longitudinal sectional view of the clutches, the section being taken on a plane at right angles to that of Figs. 1, 5 and 6 and on line 10—10 of Fig. 7.

The rings 49 and 50 are arranged to be turned with the idler member 38 as it revolves with the coupling sleeve 40 and tail shaft 15. These rings however, have a certain limited amount of play, or angular movement, relative to the idler. Before the coupling sleeve can engage clutch member 36 the teeth 42 of the former must pass through the notches in the edge of ring 49, and they cannot do this unless the teeth 53 on the ring register with those on the idler 38, which, of course, means that they also register with the spaces between the teeth on the coupling ring, as seen in Fig. 8. The means for causing the blocking rings 49 and 50 to be carried around with idler 38 consists of one or more pins 54 carried by each ring and extending into elongated openings or slots 55 in the idler. When the ring is at either limit of its movement, that is, when the pin is at either end of its slot, the teeth on the ring are in register with the spaces between the teeth of the idler 38 and with the teeth 42 of the coupling sleeve 40, and the latter is for the present prevented from moving farther to the left and therefore will not couple with clutch member 36.

Means are provided whereby the blocking ring will always be thrown around to the limit of its movement with respect to idler 38 before the teeth of the coupling sleeve can engage those of clutch member 36.

This is accomplished by permitting the idler to move axially and by providing a drag between the idler and the coupling sleeve, so that when the latter starts to move axially it will move the idler ahead of it in the same direction and press the friction ring 51 against the clutch member 36. A suitable means for producing a drag between the idler 38 and the coupling sleeve 40 consists of two or more steel balls 56 carried by the idler and spring-pressed radially into contact with coupling sleeve 40. Idler 38 moves easily, as it does not transmit power. When the idler moves axially to the left in Fig. 1 it presses blocking ring 49 against clutch member 36, and the frictional engagement between member 36 and the ring causes the latter to turn until its pins 54 are stopped by the ends of the slots 55 in the idler 38. In this position, as explained above, the teeth on the blocking ring intercept those on the coupling sleeve 40 and the latter is prevented from moving farther toward clutch member 36 as long as the ring remains in this position relative to idler 38.

When the parts are as seen in Fig. 1, with the teeth of coupling sleeve 40 engaged with those of clutch member 37 the main shaft 11 is coupled to the tail shaft 15 directly. Now, suppose shaft 11 and tail shaft 15 are turning counterclockwise (looking toward the engine, that is, to the left in Fig. 1) and the speed is such that a shift to the overdrive condition is in order. Idler 38 is revolving with the coupling sleeve 40 but clutch member 36 is turning faster and in the same direction as the coupling sleeve. Suppose the driver now partly releases the accelerator of the engine: As soon as the engine slows down slightly the pressure between the teeth of clutch member 37 and those of coupling member 40 will be reduced and the weights will fly out, carrying the coupling member to the left out of coupling relationship with clutch member 37. However, the drag between the coupling member and idler 38 causes the latter to move in the same direction, forcing the blocking ring 49 against clutch member 36. As the latter is moving faster than the idler the ring will be carried forward with relation to the idler into blocking position and will be held there as long as member 36 continues to move faster than the idler and the ring. This is the condition shown in Fig. 6. As the engine slows down, however, clutch member 36 slows down with it, and when member 36 just begins to turn slower than the idler and coupling sleeve the relative direction of movement between member 36 and idler 38 reverses, and the friction between member 36 and the ring causes the latter to turn backward with relation to the idler and the coupling sleeve. The centrifugal weights have, in the meantime, been urging the coupling sleeve to the left, and when the teeth on the ring pass the spaces between the teeth of the coupling sleeve these teeth slip through and couple with those of member 36. The parts are then as seen in Fig. 5, and the device is in "overdrive" with the tail shaft 15 revolving at a higher rate than that of the main shaft 11, which means that the same speed of the vehicle, assumed above to be 45 miles per hour, will be maintained with the engine running at a considerably lower speed than before.

Assuming now that the vehicle is running in overdrive at a speed above 45 miles per hour. If the driver permits it to slow down to 45 miles per hour a shift back to direct drive should not take place, as "hunting" would occur if the shift-up speed and the shift-down speed were the same. Referring to Fig. 5, it will be seen that the detent balls 47 have dropped into a pair of recesses 57. As the speed of the vehicle continues to fall the tendency of the weights to fly out becomes less than sufficient to overcome the tendency of spring 41 to pull them in toward the center of rotation, but the movement of the weights and the coupling sleeve 40 is prevented for the present by the ball detent. When the speed has fallen to, say, 30 miles per hour the balls are forced out of the recesses 57 and the coupling sleeve 40 starts to move to the right. This uncouples the tail shaft 15 from the clutch member 36, but the blocking ring 50 prevents the sleeve from moving far enough to cause its teeth to clash with those of clutch member 37. This is because the idler 38 is carried by the sliding sleeve into contact with the slower moving member 37 and the blocking ring is thus turned backward to a position where its teeth intercept those of the sleeve 40. The driver now speeds up the engine until the speed of clutch member 37 equals that of the tail shaft 15 and the coupling sleeve 40. Just as the speed of member 37 very slightly exceeds that of the coupling sleeve, ring 50 is moved forward with relation to idler 38 and the coupling sleeve. As the teeth on the ring pass the spaces between the teeth on the coupling sleeve the latter shifts to the right and couples with member 37 and establishes the direct drive connection.

It will be seen that each of the blocking rings 49 and 50 is adapted to prevent coupling of the clutch parts when it is turned in either direction from a midway position, and to permit such coupling when in this midway position. If clutch member 36 turns either faster or slower than coupling sleeve 40 when the latter is moved toward it, the clutch will not close until the speed of the engine is decreased or increased sufficiently to cause member 36 to have the same or approximately the same speed as the coupling sleeve. Similarly, if clutch member 37 turns either faster or slower than the coupling sleeve the clutch formed by these members will not close until the engine speed is changed to make the speed of member 37 the same or approximately the same as that of the coupling sleeve. This assures the ability of the device to always effect a coupling between the engine and the drive wheels of the vehicle and prevent the latter being without power to drive it.

The detent formed by the balls 47 and the recesses 48 and 57 provides a positive overlap of the shift-up and shift-down speeds, and also assures that when the coupling sleeve starts to shift from one coupling position to the other there will be much more power than is required to carry it over.

Figures 11, 12:
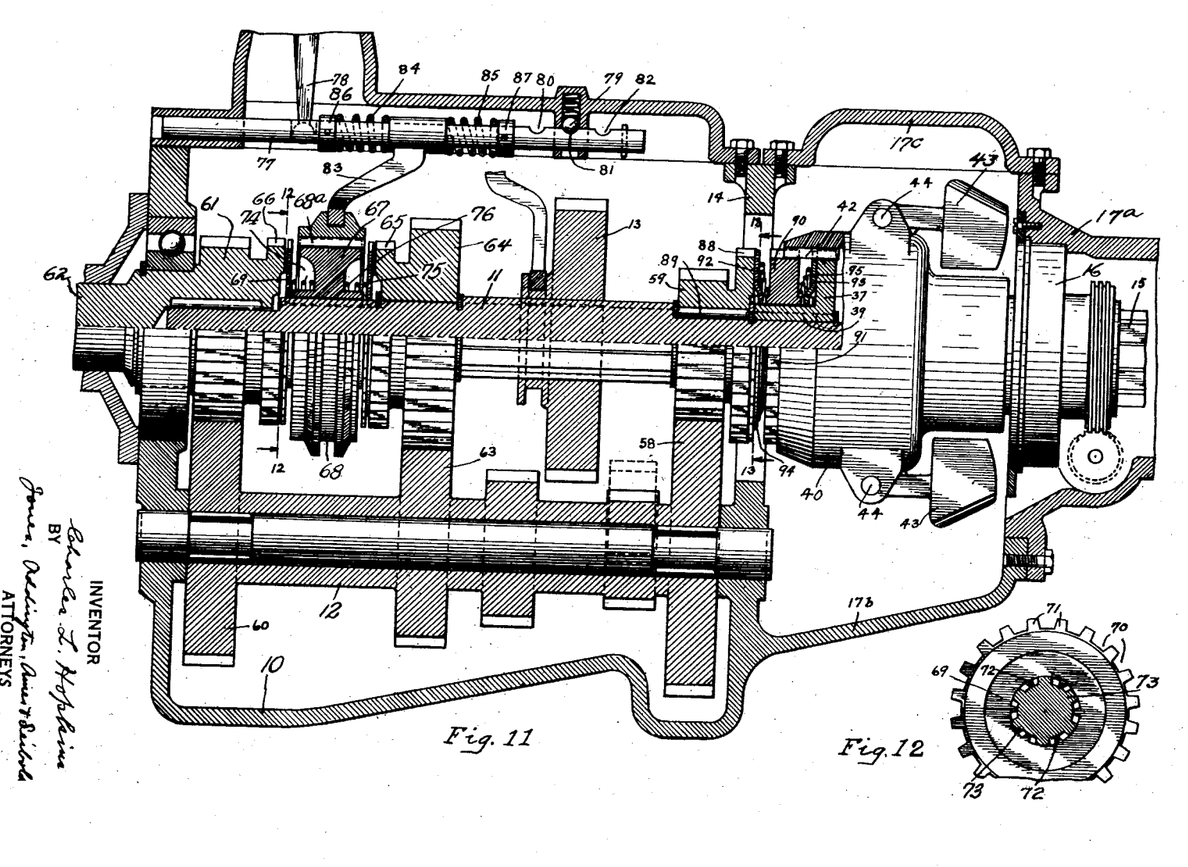
Fig. 11 is a view similar to Fig. 1, but showing a different method for obtaining the fourth (overdrive) speed and a slightly different means for preventing the automatic clutch from closing before the clutch parts synchronize. In this figure I also show how the transmission itself may be provided with a non-clashing clutch for shifting back and forth between second speed and direct drive.
Fig. 12 is a cross-section on line 12—12 of Fig. 11.

In the overdrive transmission shown in Fig. 11, the planetary gearing is omitted, and the fourth speed is obtained by adding an extra gear 58 on the countershaft gear cluster 12 and meshing this gear with another gear 59 which is carried by the main transmission shaft 11, but turns independently of the latter. This gear 59 is provided with clutch teeth for engagement by the teeth on the coupling sleeve 40. The countershaft cluster includes, as usual, a gear 60 which meshes with a pinion 61 which is formed on the end of power shaft 62. The gear cluster 12 includes also gear 63 which meshes with gear 64, the latter being carried by the main transmission shaft 11, but turning independently of it. Gear 64 is formed with a series of clutch teeth 65, and pinion 61 is formed with a similar series of clutch teeth 66. Splined to shaft 11, so as to turn with it, is another clutch member 67 having clutch teeth similar to those on pinion 61 and gear 64. A sleeve 68, formed with internal teeth 68a, turns with member 67, but may be slide back and forth to couple member 67, and consequently shaft 11, with either pinion 61 or gear 64, so as to cause the shaft to be driven directly by power shaft 62 or through gearing at a lower speed.

This type of change-speed gearing is well known and in general use, and is sometimes provided with means to speed up or slow down the countershaft gear cluster 12 and gears 64 and 61 as the sleeve 68 is moved toward gear 64 when shifting into second speed, or toward pinion 61 when shifting into direct drive. Such synchronizing devices, however, require, when shifting gears, that the power shaft be disconnected from the engine, as by opening the main clutch, located ahead of the transmission, or that shaft 11 be disconnected from the drive wheels of the car, as is true under certain conditions when an overrunning clutch is provided between the transmission and the drive wheels. The means employed in the overdrive device shown in Figs. 1 to 10 for assuring synchronization of the clutch parts before they are permitted to engage is well adapted for use in the transmission and, when present, prevents clashing when shifting back and forth between second speed and direct drive. It also permits shifting to be accomplished without the driver being compelled to push out the main clutch, even with a direct connection between the main shaft of the transmission and the drive wheels.

Between clutch member 67 and pinion 61 is arranged a blocking member 69 consisting of a flat ring having notches 70 cut in its outer edge (see Fig. 12), the teeth 71 between the notches being somewhat narrower than the teeth 65 or 66. On its inner edge this ring 69 is formed with a number of narrow projections or teeth 72 which extend into the spaces between the splines 73 on shaft 11. These teeth are of such width with respect to the spaces between the splines that when turned in either direction the teeth 71 align themselves with those of the slidable sleeve 68 and prevent coupling between the sleeve and pinion 61. A spring 74 constantly presses the ring toward pinion 61, whereby the ring will always be urged around one way or the other with respect to member 67. The functioning this blocking ring in preventing coupling of the sleeve with pinion 61 does not require detailed explanation here, as it has been fully discussed in connection with the description of the overdrive device of Fig. 1.

Between clutch member 67 and gear 64 is located another blocking ring 75, pressed toward gear 64 by a spring 76. This ring, as in the case of ring 69, has a limited rotary movement with respect to clutch member 67 and shaft 11.

Shifter slide bar 77 is mounted to have endwise movement when the shifting lever 78 is engaged with it and thrown forward or back. The usual detent means are provided for holding the shifter slide bar in any one of three positions: forward for direct drive, back for second speed, and in an intermediate position for neutral. This detent means may consist of a spring-pressed steel ball 79 seating in any one of three notches 80, 81, or 82. The shifter yoke 83 may be secured directly to the slide bar 77 as usual, but is preferably arranged so as to be permitted to slide on the bar. A pair of springs 84 and 85, one on each side of the yoke, tend to hold it midway between two collars 86 and 87 on the slide bar.

In Fig. 11 the coupling sleeve 68 is shown in neutral position. Assume, however, that it has been slide to the right (second gear position). Shaft 11 will be coupled to gear 64. Pinion 61 will be turning faster than member 67 and coupling sleeve 68. Detent ball 79 will be in notch 80. If now the driver of the car moves shift lever 78 to high gear position, coupling sleeve 68 will move to the left, disengaging itself from gear 64, but will be prevented by blocking ring 69 from coupling with pinion 61 because the pinion is turning faster than the ring and will hold it in a blocking position. Slide bar 77 will, however, move to the left until detent ball 79 drops into notch 82. The driver may now remove his hand from the shift lever, and the detent will hold it in high gear position. Spring 85, which is now compressed, urges coupling sleeve 68 toward pinion 61. If the driver has pushed open the main clutch, the speed of shaft 62 and pinion 61 decreases rapidly and, at the instant when the relative movement between clutch member 67 and pinion 61 reverses in direction, the blocking ring turns relatively to member 67 and the teeth of the coupling sleeve pass through the spaces between the teeth of the ring and engage teeth 66 on the pinion. If the driver did not open the main clutch, coupling will occur if and when he permits the engine to slow down. If the driver, after shifting out of second, remain for a time in neutral before going to high and slows down the engine in the meantime, then tries to shift into high, coupling will occur when the engine speed increases and the speed of pinion 61 very slightly exceeds that of member 67.

When shifting down from high to second gear, the coupling sleeve 68 has to engage with the clutch teeth 65 of gear 64, which is turning slower than member 67 and the coupling sleeve, and it is therefore necessary for the driver to speed up the engine to make the speed of gear 64 equal to that of the coupling sleeve. If the driver did not push out the main clutch before he threw the shift lever to second gear position, he would only have to increase the engine speed slightly, whereupon the engine would pick up the car and drive it forward, with the engine turning over faster than before. Opening of the main clutch is not necessary in shifting up to either second or high, or down to second. If, when shifting into second, the driver pushes out the main clutch, he simply moves the shift lever to second gear position and removes his hand from the lever. Then he lets in the clutch and speeds up the engine. At the correct engine speed, the engine picks up the car and drives it forward.

Springs 84 and 85 may be dispensed with, and the shifter yoke 83 rigidly secured to the shifter slide bar 77 if desired. With such a construction, the driver, when making a shift, keeps his hand on the shift lever and presses it toward the new position until the shift is completed.

In automatic transmissions where the shifting is done by centrifugal force acting on weights or by some other means which depend upon car speed or load, and also in situations where fluid pressure motors or similar means are used for throwing the shifter slides from one position to another, clutches of this type may be employed to advantage. In such cases, it is of the utmost importance that clashing of clutch teeth be avoided, and, furthermore, in the designing of such gear shifting devices, it is of advantage to be able to provide for shifting from one gear ratio to another without the necessity of opening the main clutch. An example of this is seen in the overdrive, in which shifting back and forth between different speed ratios must be accomplished while the engine is still connected to the transmission shaft.

Figure 13:
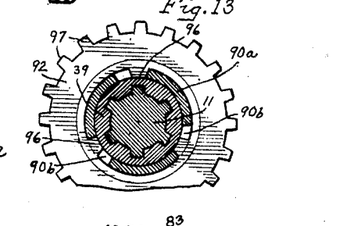
Fig. 13 is a cross-section on line 13—13 of Fig. 11.

Referring now to the automatic overdrive portion of the transmission shown in Fig. 11, it will be seen that the direct drive is through clutch member 37 and coupling sleeve 40, as in Fig. 1, but the overdrive is obtained by engaging the coupling sleeve with the clutch teeth 88 on gear 59. This gear, as already explained, is driven from gear 58, which is part of the countershaft gear cluster. Gear 59 revolves faster than the main transmission shaft 11, and is provided with anti-friction rollers 89 arranged around the shaft. Between gear 59 and clutch member 37, and arranged to turn on the hub 39 of member 37, is an idler member 90 formed with teeth 91 which constantly mesh with the teeth 42 of the coupling sleeve 40, as in the form shown in Fig. 1. The parts within the coupling sleeve, which are not seen in Fig. 11, are like those in Fig. 1, and no description of these parts or explanation of their operation is required here. The same is true of the centrifugal weights 43, 43. The blocking members 92 and 93, however, are slightly different from those of Fig. 1, being constantly pressed into contact with the adjacent clutch members by springs 94 and 95. Idler member 90 in this instance is formed with a hub 90a on each side, and these hubs are formed with notches 90b, as seen best in Fig. 13. Into these notches extend tongues 96 formed on the inner edges of the blocking rings. The notches 90b are of sufficient width and so located as to permit each ring to turn in either direction with respect to the idler member just far enough to bring the teeth 97 of the ring to blocking position. When the ring is midway between these two positions, the spaces between the teeth register with the teeth of the coupling sleeve 40 and with the spaces between the teeth on the idler 90, and thus permit the coupling sleeve to move into engagement with the clutch teeth on gear 59 or member 37, as the case may be.

Figure 14:
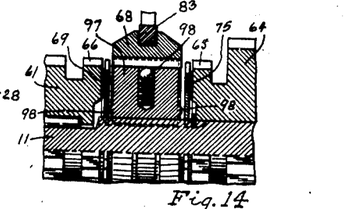
Fig. 14 is a fragmentary vertical longitudinal section of a modified form of clutch.

Various modifications in the type of clutch employed in the transmissions shown and described in this specification are possible, and in Fig. 14 there is illustrated a form adapted for use as a second-to-high shifter, and which is slightly different from what is seen in Fig. 11. In this modification, the blocking rings are similar to those shown in Figs. 11 and 12, but these rings are not constantly held in contact with clutch members. The clutch member 97, which is splined to the main shaft 11, is permitted a slight movement lengthwise of the shaft, and has an annular projection or rib 98 on each side. These ribs engage the blocking rings to force them against the other clutch members when the member 97 is slid along the shaft. A drag between the member 97 and coupling sleeve 68 is afforded by a number of balls 98 carried in recesses in member 97 and spring-pressed against the coupling sleeve. When the sleeve starts to move, it first pushes member 97 against the blocking ring and thus causes the latter to engage and be turned by the clutch member toward which the coupling sleeve is being moved. The action is the same as already explained in connection with the clutch system of the overdrive in Figs. 1 to 10.

Further modifications will be apparent to those skilled in the art, and it is desired, therefore, that the invention be limited only by the prior art and the scope of the appended claims.

Having thus described my invention, what I claim and desire to secure by Letters Patent is:

1. Power transmission mechanism including a driving shaft, a toothed clutch member rotatable therewith, a driven shaft coaxial with said driving shaft, a gear train including a gear rotating faster than the driving shaft and having a set of clutch teeth, a shiftable toothed clutch member connected to rotate with the driven shaft, speed-responsive means driven at a speed proportional to that of the driven shaft and arranged to shift the shiftable clutch member into engagement with the first-named toothed clutch member and thereby connect the driven shaft directly to the driving shaft, or into engagement with the clutch teeth of said gear and thereby cause the driven shaft to be driven through the gear train at a higher speed, blocking means so arranged that when the shiftable clutch member has been disengaged from one set of clutch teeth it is positively prevented from engaging with the other set of clutch teeth until the relative rotation between itself and said other set of clutch teeth reverses in direction, and means for controlling the speed-responsive means so arranged that the driven-shaft speed at which the shiftable clutch member is caused to disconnect the two shafts and couple with said gear is substantially higher than that at which it is caused to uncouple from the gear and connect the two shafts directly.

2. Power transmission mechanism including a driving shaft, a toothed clutch member coaxial therewith and rotating therewith, a gear train driven from said driving shaft and including a gear coaxial with said shaft, a second toothed clutch member rotating with said gear, one of said clutch members rotating faster than the other, a driven shaft coaxial with the driving shaft, a coupling member arranged to couple said driven shaft to either of said clutch members, centrifugal weights carried by said coupling member and operable to urge it toward coupling relation with the fast clutch member, detent means arranged to delay the uncoupling of the coupling member from the slow clutch member until a definite driven-shaft speed is attained, means arranged to positively block the coupling member and thus prevent its further movement toward the fast clutch member until the speed of the driving shaft has been reduced to bring the speed of said fast clutch member down to that of the coupling member, spring means opposing the weights and tending to urge the coupling member toward coupling relation with the slow clutch member, detent means arranged to delay the uncoupling of the coupling member from the fast clutch member until the speed of the driven shaft has fallen to a definite value, substantially lower than that at which the first-named detent means permits the coupling member to uncouple from the slow clutch member, and means arranged to block the coupling member and prevent its further movement toward the slow clutch member until the speed of the driving shaft has been increased to bring the speed of the slow clutch member up to that of the coupling member.

3. Power transmission mechanism including a driving shaft, a toothed clutch member coaxial therewith and rotating therewith, a gear train driven from said driving shaft and including a gear coaxial with said shaft, a second toothed clutch member rotating with said gear, one of said clutch members rotating faster than the other, a driven shaft coaxial with the driving shaft, a coupling member arranged to couple said driven shaft to either of said clutch members, centrifugal weights carried by said coupling member and operable to urge it toward coupling relation with the fast clutch member, detent means arranged to delay the uncoupling of the coupling member from the slow clutch member until a definite driven-shaft speed is attained, means arranged to positively block the coupling member and thus prevent its further movement toward the fast clutch member until the speed of said fast clutch member is reduced to cause the relative rotary movement between it and said coupling member to be reversed in direction, spring means opposing the centrifugal weights and tending to urge the coupling member toward coupling relation with the slow clutch member, detent means arranged to delay the uncoupling of the coupling member from the fast clutch member until the speed of the driven shaft has fallen to a definite value, substantially lower than that at which the first-named detent means permits the coupling member to uncouple from the slow clutch member, and means arranged to block the coupling member and prevent its further movement toward the slow clutch member until the speed of the slow clutch member is increased to cause the relative rotary movement between it and the coupling member to be reversed in direction.

4. Power transmission mechanism including a driving shaft, a driven shaft coaxial therewith, a planetary gear train comprising a stationary sun gear, an internal ring gear and a set of planetary pinions, a carrier for the pinions connected to rotate with the driving shaft, a clutch member rotatable with the driving shaft, a shiftable clutch member connected to rotate with the driven shaft, a clutch member carried by the ring gear, speed-responsive means driven at a speed proportional to that of the driven shaft, said speed-responsive means being arranged to cause the shiftable clutch member to couple with the first-named clutch member and thus connect the two shafts together directly or to couple with the clutch member carried by the ring gear so as to cause the driven shaft to be driven through the planetary gear train at a higher speed, and means for controlling the speed-responsive means so arranged that the driven-shaft speed at which the shiftable clutch member is caused to disconnect the two shafts and couple the driven shaft with the ring gear is higher than that at which it is caused to uncouple it from the ring gear and connect the two shafts directly.

5. Power transmission mechanism including a driving shaft, a toothed clutch member rotatable therewith, a driven shaft coaxial with said driving shaft, a planetary gear train driven from said driving shaft and including a ring gear coaxial with said shafts and rotating at a speed higher than that of said driving shaft, a second toothed clutch member carried by said ring gear, a shiftable coupling member rotating with the driven shaft, centrifugal weights rotatable about the axis of the shafts and operable to urge the coupling member toward the second-named clutch member and to thereby connect the driven shaft to the driving shaft through the planetary gear train, spring means arranged to oppose the tendency of the weights to shift the coupling member and operable to urge it toward the first-named clutch member to thereby connect the driven shaft directly to the driving shaft, positive blocking means so arranged that when the coupling member has been disengaged from one clutch member it is prevented from engaging the other clutch member until the speed of the driving shaft has been changed to cause the speed of such other clutch member to become equal to that of the coupling member, and controlling means so arranged that the driven-shaft speed at which the coupling member is caused to disconnect the two shafts is higher than that at which it is caused to uncouple from the ring gear.

6. Power transmission mechanism including a driving shaft, a toothed clutch member rotatable therewith, a driven shaft coaxial with the driving shaft, a planetary gear train including a ring gear coaxial with the shafts and rotating faster than the driving shaft, a second toothed clutch member carried by said ring gear, a shiftable toothed coupling member connected to rotate with the driven shaft, speed-responsive means driven at a speed proportional to that of the driven shaft and arranged to shift the coupling member into engagement with the first-named toothed clutch member and thereby connect the driven shaft directly to the driving shaft or into engagement with the second-named clutch member and thereby cause the driven shaft to be driven through the gear train at a higher speed, positive blocking means so arranged that when the coupling member has been disengaged from one of the clutch members it is prevented from engaging with the other until the relative rotary motion between itself and said other clutch member reverses its direction, and means for controlling the speed-responsive means so arranged that the driven-shaft speed at which the shiftable coupling member is caused to disconnect the two shafts is higher than that at which it is caused to uncouple from the ring gear.

7. Power transmission mechanism including a driving shaft, a toothed clutch member rotatable therewith, a driven shaft coaxial with said driving shaft, a planetary gear train driven from said driving shaft and including a ring gear coaxial with said shafts and rotating at a speed higher than that of said driving shaft, a second toothed clutch member carried by said ring gear, a shiftable coupling member rotating with the driven shaft, centrifugal weights rotatable about the axis of the shafts and operable to urge the coupling member toward the second-named clutch member and to thereby connect the driven shaft to the driving shaft through the planetary gear train, spring means arranged to oppose the tendency of the weights to shift the coupling member and operable to urge it toward the first-named clutch member to thereby connect the driven shaft directly to the driving shaft, positive blocking means so arranged that when the coupling member has been disengaged from one clutch member it is prevented from engaging the other clutch member until the speed of the driven shaft has been changed and thereby the relative rotary movement between the coupling member and such other clutch member is reversed in direction, and controlling means so arranged that the driven-shaft speed at which the coupling member is caused to disconnect the two shafts is higher than that at which it is caused to uncouple from the ring gear.

8. Power transmission mechanism including a driving shaft, a clutch member coaxial therewith and rotating therewith, a gear train driven from said driving shaft and including a gear coaxial with said shaft, a second clutch member rotating with said gear, one of said clutch members rotating faster than the other, a driven shaft coaxial with the driving shaft, a coupling device arranged to rotate with said driven shaft and to couple the same to either of said clutch members and comprising centrifugal means operable to urge it toward coupling relation with the fast clutch member, detent means arranged to delay uncoupling from the slow clutch member until a definite driven-shaft speed is attained, means arranged to positively block the coupling device and thus prevent its further movement toward the fast clutch member until the speed of said fast clutch member is reduced to cause the relative rotary movement between it and said coupling device to be reversed in direction, said coupling device including also spring means opposing the centrifugal means and tending to urge the coupling device toward coupling relation with the slow clutch member, detent means arranged to delay uncoupling from the fast clutch member until the speed of the driven-shaft has fallen to a definite value substantially lower than that at which the first-named detent means permits uncoupling from the slow clutch member, and means arranged to block the coupling device and prevent its further movement toward the slow clutch member until the speed of the slow clutch member is increased to cause the relative rotary movement between it and the coupling device to be reversed in direction.

9. Power transmission mechanism including a driving shaft, a clutch member coaxial therewith and rotating therewith, a gear train driven from said driving shaft and including a gear coaxial with said shaft, a second clutch member rotating with said gear, one of said clutch members rotating faster than the other, a driven shaft coaxial with the driving shaft, a coupling device arranged to rotate with said driven shaft and to couple the same to either of said clutch members and comprising centrifugal means operable to urge it toward coupling relation with the fast clutch member, detent means arranged to delay uncoupling from the slow clutch member until a definite driven-shaft speed is attained, means arranged to block the coupling device and thus prevent its further movement toward the fast clutch member until the speed of said fast clutch member is reduced to substantially that of the coupling device, said coupling device including also spring means opposing the centrifugal means and tending to urge the coupling device toward coupling relation with the slow clutch member, detent means arranged to delay uncoupling from the fast clutch member until the speed of the driven-shaft has fallen to a definite value substantially lower than that at which the first-named detent means permits uncoupling from the slow clutch member, and means arranged to block the coupling device and prevent its further movement toward the slow clutch member until the speed of the slow clutch member is increased to substantially that of the coupling device.

CHARLES L. HOPKINS.

CERTIFICATE OF CORRECTION.

Patent No. 2,223,614.   December 3, 1940.

CHARLES L. HOPKINS.

It is hereby certified that error appears in the printed specification of the above numbered patent requiring correction as follows: Page 1, first column, line 48, for "cutch" read --clutch--; page 2, second column, line 3, strike out the word "in" second occurrence; page 3, first column, line 6, for "this" read --the--; page 4, first column, line 28, for "couplying" read --coupling--; line 53, for "slide" read --slid--; and second column, line 26, after "functioning" insert --of--; line 55, for "slide" read --slid--; page 5, first column, line 9, for "remain" read --remains--; line 11, for "ties" read --tries--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.